United States Patent [19]

Tsuchida et al.

[11] Patent Number: 5,538,926
[45] Date of Patent: Jul. 23, 1996

[54] ALUMINA BASED CERAMIC MATERIAL AND METHOD OF MANUFACTURING THE SAME

[75] Inventors: Takehiro Tsuchida; Tsuneo Tatsuno; Moriyoshi Kanamaru, all of Kobe, Japan

[73] Assignee: Kabushiki Kaisha Seiko Sho, Kobe, Japan

[21] Appl. No.: 360,086

[22] Filed: Dec. 20, 1994

[30] Foreign Application Priority Data

Dec. 21, 1993 [JP] Japan .................................. 5-322654
May 20, 1994 [JP] Japan .................................. 6-106630

[51] Int. Cl.⁶ .................................................. C04B 35/76
[52] U.S. Cl. ........................ 501/89; 501/95; 501/127; 501/128
[58] Field of Search ....................... 501/89, 95, 128, 501/87, 88, 103, 104, 108, 123, 127, 152, 153, 102

[56] References Cited

U.S. PATENT DOCUMENTS

| | | | |
|---|---|---|---|
| 4,507,224 | 3/1985 | Toibana et al. | |
| 4,543,345 | 9/1985 | Wei | 501/95 |
| 4,652,413 | 3/1987 | Tiegs | 501/89 |
| 4,867,761 | 9/1989 | Brandt et al. | 51/309 |
| 4,956,315 | 9/1990 | Mehrotra et al. | 501/95 |
| 5,009,822 | 4/1991 | Sacks et al. | 501/105 |
| 5,196,386 | 3/1993 | Furuse et al. | 501/88 |
| 5,207,958 | 5/1993 | Tiegs | 501/89 |
| 5,376,600 | 12/1994 | Tiegs | 501/95 |
| 5,389,586 | 2/1995 | Rogers et al. | 501/95 |

FOREIGN PATENT DOCUMENTS

| | | |
|---|---|---|
| 0310342 | 4/1989 | European Pat. Off. |
| 8605480 | 9/1986 | WIPO |
| WO91/08994 | 6/1991 | WIPO |
| WO93/11086 | 6/1993 | WIPO |

*Primary Examiner*—Paul Marcantoni
*Attorney, Agent, or Firm*—Oblon, Spivak, McClelland, Maier & Neustadt

[57] ABSTRACT

A mixed powder containing: 5–30 wt % of SiC whiskers; 3–30 wt % of a sintering auxiliary agent composed of one kind or more of oxides of Mg, Si, Ca, Ti, Zr, Cr, Ni, Y and rare earth elements; and an $Al_2O_3$ powder as a base material; or further containing 0.5–40 wt % of one kind or more of compounds composed of one kind or more of transient elements in the groups IVa, Va, and VIa of the periodic table and one kind or more of C, N and B, are compacted and subjected to pressureless-sintering in a nitrogen containing inert gas atmosphere at a temperature between 1500° and 1900° C. With this method, the SiC whiskers containing $Al_2O_3$ based ceramic material, which is densified and has a sufficient strength and toughness, can be formed in a complex shape and a large size.

10 Claims, 1 Drawing Sheet

ALUMINA BASED CERAMIC MATERIAL AND METHOD OF MANUFACTURING THE SAME

BACKGROUND OF THE INVENTION

1. Field of the Invention

The present invention relates to an $Al_2O_3$ (alumina) based ceramic material and a method of manufacturing the same. In particular, the present invention concerns an $Al_2O_3$ based ceramic material suitable for tools requiring high strength, toughness and wear resistance, such as cutting tools and a die extrusion plug, and mechanical parts requiring wear resistance, toughness and shock resistance, such as a pump valve and a mechanical seal; and a method of manufacturing the same.

2. Description of the Related Art

An $Al_2O_3$ based ceramic material, having a high strength and being excellent in corrosion resistance, oxidization resistance and wear resistance, has been known to be suitable for mechanical parts and jigs/tools. However, it is inferior in strength and toughness to a $Si_3N_4$ based ceramic material which has been extensively used as an engineering ceramic material.

Various attempts have been made to improve the strength and toughness of an $Al_2O_3$ based ceramic material. One is to add SiC whiskers to an $Al_2O_3$ based ceramic material, as disclosed in U.S. Pat. No. 4,543,345. This method is successful to obtain the excellent toughness; however, it presents a problem in the manufacturing process. Namely, in this method, an $Al_2O_3$ based ceramic material added with SiC whiskers (hereinafter, referred to as "SiC whiskers containing $Al_2O_3$ based ceramic material") is manufactured by hot-pressing, and is difficult to be formed in a complex shape or in a large size.

To solve this problem, a pressureless-sintering process has been attempted for a SiC whiskers containing $Al_2O_3$ based ceramic material. For example, Terry N. Tigers and others disclose a method in [J. Am. Ceram. Soc., 73[5] (1990) 1440–1442], wherein the pressureless-sintering is performed while the aspect of SiC whiskers and the kinds of sintering auxiliary agents are changed. Young-Wook Kim and others propose a method in [J. Mat. Sci., 26 (1991) 1316–1320], wherein the pressureless-sintering is performed using a special process of precipitating aluminum hydroxide in a green compact before sintering. On the other hand, the present inventors disclose a method in Unexamined Japanese Patent Publication No. HEI 4-124058, wherein $Al_2O_3$ is added with SiC whiskers and a sintering auxiliary agent composed of oxides of Mg, Si, Ca, Ti, Zr, Cr, Ni, Y and rare earth elements. In addition, either of these pressureless-sintering methods is performed at a temperature between 1500° and 1900° C. in an inert gas atmosphere such as argon for preventing the reaction between SiC whiskers and the atmospheric gas.

The above-described prior art methods using pressureless-sintering, however, has a disadvantage in that a sufficiently densified sintered body is very difficult to be obtained because the sintering is obstructed by SiC whiskers.

To cope with the disadvantage, there may be considered methods of: for example, reducing the added amount of SiC whiskers to the extent that a sufficiently densified sintered body can be obtained without any obstruction of the sintering caused by SiC whiskers; and of extremely reducing the aspect ratio of SiC whiskers or increasing the added amount of a sintering auxiliary agent as described in [J. Am. Ceram. Soc. 73[5] (1990) 1440–1442]. However, these methods tend to significantly lower the strength and toughness of an $Al_2O_3$ sintered body. Accordingly, a technique has been required, which is capable of manufacturing, a SiC whiskers containing $Al_2O_3$ based ceramic material composed of a sintered body being sufficiently densified and having a sufficient strength and toughness, by pressureless-sintering.

In addition, the manufacturing method by hot pressing described in U.S. Pat. No. 4,543,345 can manufacture only a product having a simple shape and a small size, and further it takes a lot of labor.

SUMMARY OF THE INVENTION

An object of the present invention is to solve the above-described problems of the prior arts, and to provide a SiC whiskers containing $Al_2O_3$ based ceramic material composed of a sintered body being sufficiently densified and having a sufficient strength and toughness, basically using not hot-pressing but pressureless-sintering capable of forming a product having a complex shape and a large size.

Another object of the present invention is to provide a method of manufacturing a SiC containing $Al_2O_3$ based ceramic material composed of a sintered body being sufficiently densified and having a sufficient strength and toughness, basically using pressureless-sintering.

According to a first aspect of the present invention, there is provided an $Al_2O_3$ based ceramic material comprising an $Al_2O_3$ sintered body, the $Al_2O_3$ sintered body containing:

5–30 wt % of SiC whiskers;

3–30 wt % of a sintering auxiliary agent composed of one kind or more of oxides of Mg, Si, Ca, Ti, Zr, Cr, Ni, Y and rare earth elements; and 0.2 wt % or more of nitrogen.

According to a second aspect of the present invention, there is provided an $Al_2O_3$ based ceramic material comprising an $Al_2O_3$ sintered body, the $Al_2O_3$ sintered body containing:

5–30 wt % of SiC whiskers;

0.5–40 wt % of one kind or two kinds or more of compounds composed of one kind or more of transient elements in the groups IVa, Va, and VIa of the periodic table and one kind or more of C, N and B;

3–30 wt % of a sintering auxiliary agent composed of one kind or more of oxides of Mg, Si, Ca, Ti, Zr, Cr, Ni, Y and rare earth elements; and 0.2 wt % or more of nitrogen, excluding the nitrogen contained in the nitride generated by the reaction between the transient elements and N.

According to a third aspect of the present invention, in the above $Al_2O_3$ based ceramic material, the porosity of the $Al_2O_3$ sintered body is preferably 1% or less.

According to a fourth aspect of the present invention, there is provided a method of manufacturing an $Al_2O_3$ based ceramic material comprising the steps of:

compacting a mixed powder containing: 5–30 wt % of SiC whiskers, and 3–30 wt % of a sintering auxiliary agent composed of one kind or more of oxides of Mg, Si, Ca, Ti, Zr, Cr, Ni, Y and rare earth elements, the balance being an $Al_2O_3$ based ceramic raw powder; and pressureless-sintering the green compact at a temperature between 1500° and 1900° C. in a nitrogen containing inert gas atmosphere.

According to a fifth aspect of the present invention, there is provided a method of manufacturing an $Al_2O_3$ based ceramic material comprising the steps of:

compacting a mixed powder containing: 5–30 wt % of SiC whiskers, 0.5–40 wt % of one kind or two kinds or more of compounds composed of one kind or more of transient elements in the groups IVa, Va, and VIa of the periodic table and one kind or more of C, N and B, and 3–30 wt % of a sintering auxiliary agent composed of one kind or more of oxides of Mg, Si, Ca, Ti, Zr, Cr, Ni, Y and rare earth elements, the balance being an $Al_2O_3$ based ceramic raw powder; and pressureless-sintering the green compact at a temperature between 1500° and 1900° C. in a nitrogen containing inert gas atmosphere.

The above method of manufacturing an $Al_2O_3$ based ceramic material preferably further comprises the step of hot-isostatic-pressing the sintered body obtained by the pressureless-sintering, at a temperature between 1200° and 1700° C. in a nitrogen containing inert gas atmosphere, thereby reducing the porosity of the sintered body to be 1% or less.

In the above $Al_2O_3$ based ceramic material, the sintering auxiliary agent preferably contains 0.2–10 wt % of MgO, 0.2–20 wt % of ZrO2 and 1.0–20 wt % of $Y_2O_3$ such that the total content of these oxides is 20 wt % or less.

In the above $Al_2O_3$ based ceramic material, the particle size of $Al_2O_3$ in the $Al_2O_3$ sintered body is preferably 5 μm or less.

In the above $Al_2O_3$ based ceramic material, preferably, the average aspect ratio of the SiC whiskers is 3 or more, and the diameters of the SiC whiskers are in the range of from 0.4 to 1.5 μm.

In the above $Al_2O_3$ based ceramic material, the product of the average aspect ratio of the SiC whiskers and the content of the SiC whiskers in the $Al_2O_3$ sintered body is preferably 400 or less.

In the above method of manufacturing an $Al_2O_3$ based ceramic material, preferably, the mixing for obtaining the mixed powder is performed using a ball mill, and the mixing time is set to be in the range of from 2 to 200 hr and to satisfy the equation of $t \geq 2c-20$ where $<c>$ is the content (wt %) of SiC whiskers in the mixed powder, and $<t>$ is the mixing time (hr).

In the above method of manufacturing an $Al_2O_3$ based ceramic material, preferably, the mixing for obtaining the mixed powder is performed by a wet mixing method, and the drying for the mixed powder after the mixing and before the compacting is performed by a spray-drying method.

In the above method of manufacturing an $Al_2O_3$ based ceramic material, the compacting pressure for the mixed powder is preferably in the range of from 3.0 ton/cm$^2$ or more. The ceramic material of the invention may contain 10–20 wt. % or 15–20 wt. % of the SiC whiskers.

DETAILED DESCRIPTION OF THE PREFERRED EMBODIMENTS

Figure 1:
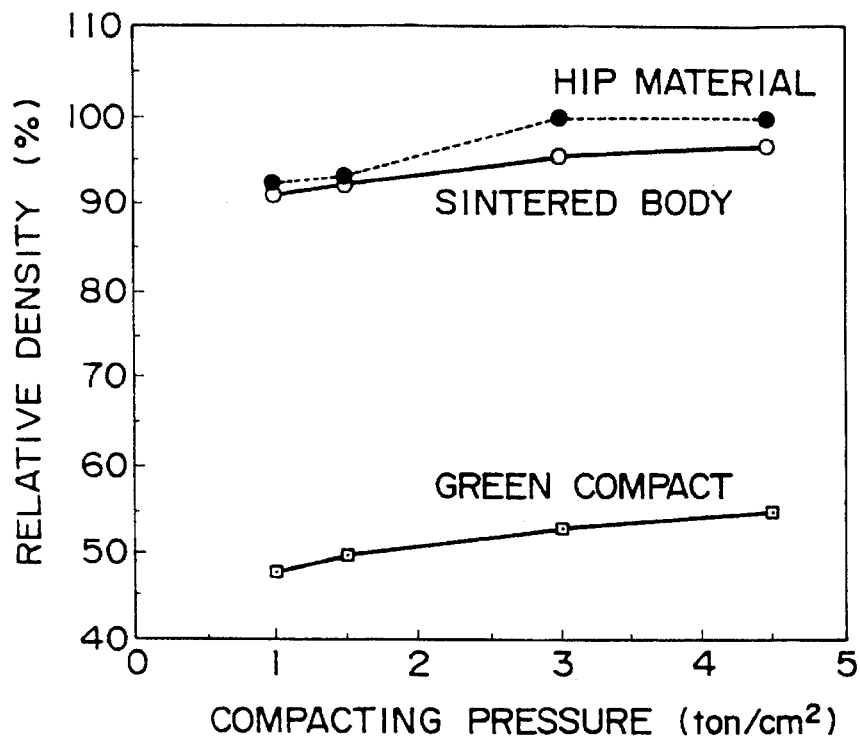
FIG. 1 is a graph showing the relationship between the compacting pressure upon die-pressing a mixed powder and relative densities of a green compact, a sintered body and an HIP material, according to Example 8.

The present inventors have studied a technique obtaining a densified sintered body having a sufficient strength and toughness, basically using pressureless-sintering. In the course of this study, it was found that in pressureless-sintering a mixed powder containing SiC whiskers, a sintering auxiliary agent composed of one kind or more of oxides of Mg, Si, Ca, Ti, Zr, Cr, Ni, Y and rare earth elements (hereinafter, referred to as "oxides of Mg and others) and an $Al_2O_3$ based ceramic raw powder, a sintering atmosphere exerts an effect on the densification of an $Al_2O_3$ sintered body. Specifically, in the case where sintering is performed in a nitrogen containing inert gas atmosphere, the above sintering auxiliary agent effectively acts to obtain an $Al_2O_3$ sintered body being sufficiently densified and having a sufficient strength and toughness. The present invention has been accomplished mainly on the basis of this knowledge.

A mixed powder containing SiC whiskers, a sintering auxiliary agent and an $Al_2O_3$ based ceramic raw powder is compacted and is subjected to pressureless-sintering, to thus obtain a sintered body containing the SiC whiskers and the sintering auxiliary agent is obtained. Here, prior to the description of the function of a nitrogen containing inert gas atmosphere during sintering, the functions of SiC whiskers and sintering auxiliary agent, which are related to the function of the above atmospheric gas, will be first described.

SiC whiskers are effective to improve the toughness of an $Al_2O_3$ based ceramic material by the function of pull-out/bridging/crack-deflection. When the content is less than 5 wt %, the effect of improving the toughness is insufficient. When it is more than 30 wt %, the densification of the ceramic material becomes difficult, and thereby the strength thereof is reduced. Accordingly, the content is required to be in the range of from 5 to 30 wt %.

In pressureless-sintering a SiC whiskers containing $Al_2O_3$ based ceramic material, the selection of a sintering auxiliary agent is an important factor. The sintering auxiliary agent acts to generate a liquid phase during sintering, which accelerates the re-arrangement of entangled SiC whiskers, thereby increasing the density of a sintered body (improving the densification). As the sintering auxiliary agent, oxides of Mg and others are suitable. Either of these sintering auxiliary agents is converted in a liquid phase under a temperature at which SiC whiskers are deteriorated. It does not react with SiC whiskers so much, and is excellent in wettability with SiC whiskers, thus effectively improving the density of a sintered body. When the content of the sintering auxiliary agent is less than 3 wt %, the above effect is insufficient. When it is more than 30 wt %, the amount of $Al_2O_3$ is relatively reduced and the excellent characteristics inherent to $Al_2O_3$ cannot be obtained. Accordingly, the content of oxides of Mg and others as the sintering auxiliary agent is required to be in the range of from 3 to 30 wt %.

The function of a nitrogen containing inert gas atmosphere during sintering will be described below.

In the case where a SiC whiskers containing $Al_2O_3$ based ceramic material is sintered in vacuum or an Ar gas atmosphere, the sintering auxiliary agent (converted in liquid phase) during sintering is significantly evaporated. This harms the function of the sintering auxiliary agent (the function of accelerating the re-arrangement of the entangled SiC whiskers). As a result, a sintered body cannot be densified.

On the contrary, in the case where the sintering is performed in a nitrogen containing inert gas atmosphere, the sintering auxiliary agent is prevented from being evaporated, and acts to accelerate the densification, thereby sufficiently densifying the sintered body. The sintered body thus obtained contains nitrogen in an amount of 0.2 wt % or more. The reason for this is unclear, but it may be considered as follows: namely, nitrogen is contained in the sintering auxiliary agent converted in liquid phase during sintering and thereby the evaporation temperature of the liquid phase is increased. However, even in the case where the sintering is performed in such nitrogen containing inert gas atmosphere, when the sintering temperature exceeds 1900° C., the sintering auxiliary agent is significantly evaporated, thus failing to obtain a sufficiently densified sintered body. On the other hand, when it is less than 1500° C., the sufficient liquid phase of the sintering auxiliary agent is not generated, so that the sintering auxiliary agent cannot be sufficiently acted, thus failing to obtain a sufficiently densified sintered body. Accordingly, the sintering temperature is required to be in the range of from 1500° to 1900° C.

The nitrogen containing inert gas atmosphere means a nitrogen gas atmosphere or a mixed gas atmosphere of nitrogen gas and an inert gas other than nitrogen gas (for example, argon gas). The pressure of the nitrogen containing inert gas is normal pressure (1 atm) because the sintering is performed at normal pressure.

The present invention is accomplished on the basis of the above-described knowledge. A method of manufacturing an $Al_2O_3$ based ceramic material according to the present invention, comprises the steps of: compacting a mixed powder containing: 5–30 wt % of SiC whiskers, and 3–30 wt % of a sintering auxiliary agent composed of one kind or more of oxides of Mg, Si, Ca, Ti, Zr, Cr, Ni, Y and rare earth elements, the balance being an $Al_2O_3$ based ceramic raw powder; and pressureless-sintering the green compact at a temperature between 1500° and 1900° C. in a nitrogen containing inert gas atmosphere. This makes it possible to manufacture the SiC whiskers containing $Al_2O_3$ based ceramic material composed of a sintered body being sufficiently densified and having a sufficient strength and toughness, basically using pressureless-sintering capable of forming a product having a complex shape and a large side.

The $Al_2O_3$ based ceramic material according to the present invention comprises an $Al_2O_3$ sintered body, the $Al_2O_3$ sintered body containing: 5–30 wt % of SiC whiskers; 3–30 wt % of a sintering auxiliary agent composed of one kind or more of oxides of Mg, Si, Ca, Ti, Zr, Cr, Ni, Y and rare earth elements; and 0.2 wt % or more of nitrogen. Accordingly, the $Al_2O_3$ based ceramic material is composed of an $Al_2O_3$ sintered body being sufficiently densified and having a sufficient strength and toughness, which can be obtained basically using pressureless-sintering.

The above mixed powder may be added with 0.5–40 wt % of one kind or two kinds or more of compounds composed of one kind or more of transient elements in the groups IVa, Va, and VIa of the periodic table and one kind or more of C, N and B. In this case, part of the compounds is entrapped in crystal grains of $Al_2O_3$, and dislocations are generated in the crystal grains of $Al_2O_3$ due to the difference in the thermal expansion coefficient between the compounds and $Al_2O_3$ upon cooling after pressureless-sintering. As a result, there can be obtained the $Al_2O_3$ based ceramic material being further excellent in the strength and toughness. As for the content of the above compounds, when it is less than 0.5 wt %, the effect of improving the strength and toughness cannot be achieved; while when it is more than 40 wt %, the amount of $Al_2O_3$ is relatively reduced and the excellent characteristics inherent to $Al_2O_3$ cannot be achieved.

In the above $Al_2O_3$ based ceramic material containing the compounds of one kind or more of the transient elements and one kind or more of C, N and B, the content of nitrogen other than the nitrogen in the nitride is 0.2 wt %. Namely, in the case where the above compounds contain the nitride (the compound of the above transient element and N), the content of nitrogen other than N constituting the nitride is 0.2 wt % or less. On the other hand, in the case where the compounds do not contain the nitride, the content of nitrogen in the $Al_2O_3$ based sintered body is 0.2 wt % or less, just as in the $Al_2O_3$ based ceramic material not containing the above compound.

As described above, in the $Al_2O_3$ based ceramic material of the present invention is composed of the $Al_2O_3$ sintered body being sufficiently densified and having a sufficient strength and toughness. However, by specifying the porosity of the sintered body to be in the range of 1% or less, the strength and toughness of the sintered body can be further enhanced. Additionally, in the sintered body having the porosity more than 1%, pores act as the starting points of cracking resulting in the reduced strength, as compared with the sintered body having the porosity of 1% or less.

The sintered body having the porosity of 1% or less can be obtained by hot-isostatic-pressing (HIP) the sintered body obtained by pressureless-sintering. In particular, the sintered body having a porosity of 5% or less after pressureless-sintering can be certainly changed into that having a porosity of 1% or less by HIP. At this time, a nitrogen containing inert gas atmosphere is effective in removing pores (easily densifying the sintered body) and reducing the porosity more than in air or in an Ar gas atmosphere, for the same reason in the pressureless-sintering. As for the temperature of HIP, when it is less than 1200° C., the effect of removing pores is insufficient; while when it is more than 1700° C., the growth of grains of $Al_2O_3$ reduces the strength and toughness. Accordingly, the temperature of HIP is preferably in the range of from 1200° to 1700° C. Therefore, it is desirable to reduce the sintered body after pressureless-sintering to be 1% or less by applying HIP to the sintered body in an inert gas atmosphere at a temperature between 1200° and 1700° C. In addition, when the pressure of the nitrogen containing inert gas atmosphere is less than 500 atm, pores are difficult to be removed; while it is more than 2000 atm, unnecessary residual stress tends to remain in the ceramic material. Accordingly, the pressure of the nitrogen containing inert gas atmosphere is preferably in the range of from 500 to 2000 atm.

The $Al_2O_3$ based ceramic material of the present invention contains 3–30 wt % of the sintering auxiliary agent composed of one kind or more of oxides of Mg, Si, Ca, Ti, Zr, Cr, Ni, Y and rare earth elements. In particular, by use of the sintering auxiliary agent which contains 0.2–10 wt % of MgO, 0.2–20 wt % of $ZrO_2$ and 1.0–20 wt % of $Y_2O_3$ such that the total content of these oxides is 20 wt % or less, even an $Al_2O_3$ based ceramic material containing SiC whiskers in a relatively large amount (for example, 15 wt % or more) can be densified and increased in hardness. The reason for this is that the use of the MgO, $ZrO_2$ and $Y_2O_3$ in the above amounts accelerates the sintering and suppresses the growth of grains, thus sufficiently keeping the hardness. In addition, when the total content of the sintering auxiliary agent is less than the above value, the sintering accelerating effect is insufficient; while it is more than the above value, the ratio of the sintering auxiliary agent in the ceramic material becomes so larger that the hardness inherent to $Al_2O_3$ cannot be achieved. To certainly enhance the above effect, the total content of MgO, $ZrO_2$ and $Y_2O_3$ is preferably in the range of from 10 to 15 wt %, and more preferably, in the range of from 8 to 12 wt %.

Incidentally, the particle size of $Al_2O_3$ and the shape of SiC whisker in the matrix of an $Al_2O_3$ sintered body exert effects on the strength and toughness of the $Al_2O_3$ based ceramic material of the present invention. When the particle size of $Al_2O_3$ is more than 5 μm, the particles act as the starting points of fracture resulting in the reduced strength. Accordingly, to suppress the reduction of the strength depending on the particle size, the particle size of $Al_2O_3$ in the $Al_2O_3$ sintered body is preferably in the range of 5 μm or less. The $Al_2O_3$ based ceramic material having such particle size can be obtained by suitably controlling the manufacturing conditions using an $Al_2O_3$ based ceramic raw powder having a particle size of 5 μm or less.

As for the shape of SiC whiskers, the toughness and strength of an $Al_2O_3$ based ceramic material can be obtained by setting the average aspect ratio to be 3 or more, and the diameters to be in the range of from 0.4 to 1.5 μm. Here, SiC whiskers function as crack-bridging in an $Al_2O_3$ based ceramic material and obstruct the propagation of the cracks. The function is small when the diameters of SiC whiskers are less than 0.4 μm, and it becomes larger as the diameters are made larger. However, when the diameters are more than 1.5 μm, the SiC whiskers themselves act as the starting points of fracture, and thereby the toughness is improved but the strength is reduced. Moreover, when the aspect ratio is less than 3, such function is small. In addition, to further enhance the strength and the toughness, preferably, the aspect of SiC whiskers is 4 or more, and the diameters of SiC whiskers are in the range of from 0.6 to 1.0 μm.

According to the present invention, as described above, the content of SiC whiskers must be in the range of from 5 to 30 wt %. However, when it is more than 10 wt %, the contraction during pressureless-sintering is obstructed by the network structure formed by the mutual entanglement of SiC whiskers, and the sintering ability tends to be reduced. In this regard, the content of SiC whiskers may be in the range of 10 wt % or less to prevent the reduction of the sintering ability; however, at this time, there occurs another problem in restricting the improvement of the toughness and the strength. For this reason, it is desirable to prevent the reduction of the sintering ability even in the case where the content of SiC whiskers exceeds 10 wt %. The inventors have studied the means for coping with this inconvenience. As a result, it was found that by setting the product of the average aspect ratio of SiC whiskers and the content of SiC whiskers in an $Al_2O_3$ sintered body to be 400 or less, the sintering ability is not reduced even in the case where the content of SiC whiskers is more than 10 wt %. In other words, by setting the above product to be 400 or less, the content of SiC whiskers can be set to be in the range of 10 to 30 wt % without any reduction of the sintering ability, thus further improving the toughness and the strength of the sintered body. When the above product is more than 400, the mutual entanglement of SiC whiskers is made larger, and the repulsion thereof lowers the effect of preventing the reduction of the sintering ability. To stabilize the porosity of the $Al_2O_3$ sintered body after pressureless-sintering to be 5% or less, the product is preferably less than 300.

The $Al_2O_3$ based ceramic material in which the average aspect ratio of SiC whiskers is 3 or more can be manufactured by suitably controlling the mixing condition of a mixed powder. When the mixing is performed by a ball mill, the mixing time $<t>$ is set to be in the range of from 2 to 200 hr and to satisfy the equation of $t \geq 2c-20$ (c: content of SiC whiskers, t: hours). When the mixing time $<t>$ is more than 200 hr, the average aspect ratio becomes a value less than 3 because of breakage of SiC whiskers. When the mixing time $<t>$ is less than (2c-20), the aspect ratio becomes excessively large, and the sintering of the mixed powder is made poor. When the mixing time $<t>$ is less than 2 hr, it is difficult to obtain uniform mixing, which lowers the homogeneity of an $Al_2O_3$ base ceramic material, resulting in the reduced strength. To obtain the excellent strength, the mixing time is preferably in the range of from 4 to 100 hr.

When the mixing of the above mixed powder is performed by a wet mixing method, the obtained mixed powder is dried before compacting. This drying has been made by a tray drying method where the mixed powder is put in a metal tray and stationarily dried for several hr. However, in this drying method, even when the powder is uniformly mixed at the time of mixing, SiC whiskers are aggregated during the stationary drying and are finally made in the non-uniform state, thereby significantly reducing the strength and toughness. As compared with this tray drying, the spray drying can rapidly dry the mixed powder before the generation of the aggregation of SiC whiskers. Accordingly, in the obtained $Al_2O_3$ based ceramic material, the homogeneity of SiC whiskers is excellent, and thereby the strength and toughness are enhanced.

In general, a ceramic material is compacted at a compacting pressure between 1 and 2 ton/cm². However, for the mixed powder of the present invention, the compacting pressure is preferably in the range of 3.0 ton/cm² or more. This is based on the knowledge obtained in examining the relationship between the compacting pressure and the sintered density. Namely, when a mixed powder containing short fibers such as SiC whiskers is compacted, the usual compacting pressure (1 to 2 ton/cm²) is difficult to increase the green density by the effect of SiC whiskers, and a high compacting pressure (3.0 ton/cm² or more) is successful to improve the green density. Specifically, the relative density (green density/theoretical density of sintered body) is 50% or less for the usual compacting pressure; but it becomes 53% or more for the compacting pressure of 3.0 ton/cm² or more. The improvement of the green density means the increase in the contacts between powders and/or between SiC whiskers and powders, which accelerates the densification during sintering, resulting in the improved strength and toughness. At this time, as the compacting pressure is higher, the strength and toughness become higher. In this regard, the compacting pressure is desirable to be 4.0 ton/cm²; however, from the viewpoint of the prevention of cracks, the compacting pressure is desirable to be 10 ton/cm² or less. In addition, the compacting of a mixed powder of the present invention may be performed by die-pressing, cold-isostatic-pressing or the like.

The present invention will be more clearly understood by way of the following examples:

EXAMPLE 1

An $Al_2O_3$ powder ($Al_2O_3$ based ceramic material as a base material), SiC whiskers and a sintering auxiliary agent were wet-mixed, followed by spray-drying, and compacted by die-pressing, thus obtaining a green compact. The green compact was subjected to pressureless-sintering in a nitrogen gas ($N_2$) atmosphere at a temperature between 1500° and 1900° C., thus obtaining a sintered body (hereinafter, referred to as "pressureless sintered body"). Some of these pressureless sintered bodies thus obtained were subjected to hot-isostatic-pressing (HIP). This sintered body after being subjected to HIP is referred to as "HIP material" hereinafter. Here, the content of SiC whiskers, the kind and content of a sintering auxiliary agent, pressureless-sintering conditions (temperature, pressure), HIP conditions (temperature, time, pressure) are changed as shown in Table 1.

The pressureless sintered bodies and HIP materials thus obtained were measured for porosity, bending strength and fracture toughness, and further analyzed for the content of nitrogen. The porosity was obtained on the basis of the density measured by an Archimedes' method. The bending strength was measured by a three-point bending test. The fracture toughness was measured by an IF (Indentation Fracture) method in accordance with JIS. The content of nitrogen was analyzed by an inert gas melting method. The measured results are shown in Table 2. In the comparative examples (which does not satisfy the requirements of the present invention), the porosity was generally larger and the bending strength and the fracture toughness were small. On the contrary, in the inventive examples (which satisfies the requirements of the present invention), the porosity was generally small, and the bending strength and the fracture toughness were high. In addition, in Comparative Example No. a-2 (HIP material), the porosity was smaller and the bending strength was higher than those in Inventive Example No. A-5 (pressureless sintered body). This is due to the effect of hot-isostatic-pressing (HIP). However, as for the fracture toughness, Comparative Example No. a-2 is lower than Inventive Example No. A-5.

EXAMPLE 2

Pressureless sintered bodies and HIP materials were obtained in the same manner as in Example 1, except that the content of SiC whiskers, kind and content of a sintering auxiliary agent, pressureless-sintering conditions and HIP conditions were changed as shown in Table 3. The characteristics of these pressureless sintered bodies and the HIP materials were measured in the same manner as in Example 1. The measured results are shown in Table 4. As compared with the comparative examples, in the inventive examples, the porosity was generally small and the bending strength and fracture toughness were high.

EXAMPLE 3

An $Al_2O_3$ powder, SiC whiskers, a sintering auxiliary agent, powders of TiC or VC (compound of Ti or V as a transient element and C) were wet-mixed, followed by spray-drying and compacting, and was subjected to pressureless-sintering, thus obtaining a sintered body. Some of these sintered bodies thus obtained were subjected to HIP, thus obtaining HIP materials. Here, the content of SiC whiskers, kind and content of a sintering auxiliary agent, content of TiC or VC, pressureless-sintering conditions, and HIP conditions are changed as shown in Table 5. The characteristics of these pressureless sintered bodies and HIP materials were measured in the same manner as in Example 1. The measured results are shown in Table 6. As compared with the comparative examples, in the inventive examples, the porosity was generally small and the bending strength and the fracture toughness were high.

EXAMPLE 4

An $Al_2O_3$ powder, SiC whiskers and a sintering auxiliary agent in the composition shown in Table 7 was wet-mixed and compacted. The green compact was subjected to pressureless-sintering in nitrogen at 1500° to 1900° C, which was further subjected to HIP in nitrogen. The hardness was measured using a micro Vickers hardness tester in accordance with JIS. The measured results are shown in Table 8. As is apparent from Table 8, the inventive examples are excellent in mechanical properties and have high harnesses. On the contrary, Comparative Examples d-1 to d-3, which are different from the inventive examples in the kind of the sintering auxiliary agent, are poor in the mechanical property and low in hardness. Comparative Example d-4, in which the kind of the sintering auxiliary agent is the same as in the inventive example but the content thereof is larger, is low in hardness. Comparative Example d-5, in which the content of the sintering auxiliary agent is smaller than that of the inventive example, is poor in the densification and the mechanical properties.

EXAMPLE 5

The $Al_2O_3$ sintered body of Inventive Example No. D-2 in Table 7 of Example 4 has a bending strength of 96 kg/mm$^2$ and a fracture toughness is 4.9 MPam$^{1/2}$ (see Table 8). The particle size of the matrix ($Al_2O_3$) of this sintered body was 1.2 µm. In this example, an $Al_2O_3$ sintered body having the same composition as that of Inventive Example D-2 was manufactured in the same manner as in Example 4 except for using a $Al_2O_3$ based ceramic raw powder having a particle size larger than that of Inventive Example No. D-2. The sintered body thus obtained was measured for the particle size of the matrix and the bending strength and the fracture toughness. As a result, in this sintered body, the particle size was 7.5 µm, the bending strength was 34 kg/mm$^2$, and the fracture toughness was 5.7 MPam$^{1/2}$.

TABLE 1

| | | SiC whisker: wt % | Compound: wt % | Sintering auxiliary agent: wt % | Compacting method | Sintering condition | HIP condition |
|---|---|---|---|---|---|---|---|
| Inventive example A | 1 | 10 | — | MgO: 2<br>$Y_2O_3$: 4 | Die-pressing | 1750° C. × 1 hr, in $N_2$ | 1500° C. × 1 hr, 1500 atm, in $N_2$ |
| | 2 | 12.5 | — | $ZrO_2$: 4<br>MgO: 8 | " | 1800° C. × 1 hr, in $N_2$ | 1500° C. × 1 hr, 1500 atm, in $N_2$ |
| | 3 | 15 | — | $TiO_2$: 4<br>$ZrO_2$: 6 | " | 1850° C. × 1 hr, in $N_2$ | 1500° C. × 1 hr, 1500 atm, in $N_2$ |
| | 4 | 20 | — | MgO: 2<br>$ZrO_2$: 4<br>$Y_2O_3$: 8 | " | 1750° C. × 1 hr, in $N_2$ | 1500° C. × 1 hr, 1500 atm, in $N_2$ |
| | 5 | 10 | — | $SiO_2$: 5<br>$Y_2O_3$: 3 | " | 1700° C. × 1 hr, in $N_2$ | — (:No HIP) |

TABLE 1-continued

| | | SiC whisker: wt % | Compound: wt % | Sintering auxiliary agent: wt % | Compacting method | Sintering condition | HIP condition |
|---|---|---|---|---|---|---|---|
| Comparative example <a> | 1 | 15 | — | SiO$_2$: 8<br>Y$_2$O$_3$: 4 | " | 1800° C. × 1 hr, in Ar | 1500° C. × 1 hr, in N$_2$ |
| | 2 | 3 | — | MgO: 2<br>Y$_2$O$_3$: 4 | " | 1750° C. × 1 hr, in N$_2$ | 1500° C. × 1 hr, in N$_2$ |
| | 3 | 35 | — | MgO: 2<br>Y$_2$O$_3$: 4 | " | 1800° C. × 1 hr, in N$_2$ | 1500° C. × 1 hr, in N$_2$ |
| | 4 | 15 | — | MgO: 12<br>Y$_2$O$_3$: 24 | " | 1800° C. × 1 hr, in N$_2$ | 1500° C. × 1 hr, in N$_2$ |
| | 5 | 15 | — | SiO$_2$: 0.5<br>Y$_2$O$_3$: 1.5 | " | 1800° C. × 1 hr, in N$_2$ | 1500° C. × 1 hr, in N$_2$ |

TABLE 2

| | | Amount of N$_2$: % | Porosity | Bending strength: kg/mm$^2$ | Fracture toughness: MPam$^{1/2}$ |
|---|---|---|---|---|---|
| Inventive example A | 1 | 0.6 | 0.2 | 80 | 4.3 |
| | 2 | 0.9 | 0.2 | 84 | 4.9 |
| | 3 | 1.2 | 0.3 | 80 | 5.1 |
| | 4 | 1.2 | 0.6 | 80 | 5.5 |
| | 5 | 0.5 | 2.0 | 65 | 4.4 |
| Comparative example <a> | 1 | 0.09 | 2.9 | 42 | 3.2 |
| | 2 | 0.8 | 0.08 | 71 | 3.1 |
| | 3 | 0.9 | 7.8 | 31 | Measurement; impossible |
| | 4 | 2.1 | 1.2 | 36 | 2.9 |
| | 5 | 0.2 | 10.5 | 25 | Measurement; impossible |

TABLE 3

| | | SiC whisker: wt % | Compound: wt % | Sintering auxiliary agent: wt % | Compacting method | Sintering condition | HIP condition |
|---|---|---|---|---|---|---|---|
| Inventive example B | 1 | 10 | — | MgO: 2<br>Y$_2$O$_3$: 4 | Die-pressing | 1750° C. × 1 hr, in N$_2$ | 1500° C. × 1 hr, 1500 atm, in N$_2$ |
| | 2 | 12.5 | — | ZrO$_2$: 4<br>MgO: 8 | " | 1800° C. × 1 hr, in N$_2$ | 1500° C. × 1 hr, 1500 atm, in N$_2$ |
| | 3 | 15 | — | SiO$_2$: 8<br>Y$_2$O$_3$: 4 | Extrusion | 1800° C. × 1 hr, in N$_2$ | 1500° C. × 1 hr, 1500 atm, in N$_2$ |
| | 4 | 12.5 | TiC: 4 | SiO$_2$: 8<br>Y$_2$O$_3$: 4 | Die-pressing | 1800° C. × 1 hr, in N$_2$ | 1500° C. × 1 hr, 1500 atm, in N$_2$ |
| | 5 | 15 | — | TiO$_2$: 4<br>ZrO$_2$: 6 | " | 1850° C. × 1 hr, in N$_2$ | 1500° C. × 1 hr, 1500 atm, in N$_2$ |
| | 6 | 20 | — | MgO: 2<br>ZrO$_2$: 4<br>Y$_2$O$_3$: 8 | " | 1750° C. × 1 hr, in N$_2$ | 1500° C. × 1 hr, 1500 atm, in N$_2$ |
| | 7 | 10 | — | SiO$_2$: 5<br>Y$_2$O$_3$: 3 | " | 1700° C. × 1 hr, in N$_2$ | — (:No HIP) |
| | 8 | 12.5 | — | SiO$_2$: 8<br>Y$_2$O$_3$: 4 | Casting | 1800° C. × 1 hr, in N$_2$ | 1500° C. × 1 hr, 1500 atm, in N$_2$ |
| Comparative example <b> | 1 | 3 | — | MgO: 2<br>Y$_2$O$_3$: 4 | Die-pressing | 1750° C. × 1 hr, in Ar | 1500° C. × 1 hr, in N$_2$ |
| | 2 | 35 | — | MgO: 2<br>Y$_2$O$_3$: 4 | " | 1800° C. × 1 hr, in N$_2$ | 1500° C. × 1 hr, in N$_2$ |
| | 3 | 15 | — | MgO: 12<br>Y$_2$O$_3$: 24 | " | 1800° C. × 1 hr, in N$_2$ | 1500° C. × 1 hr, in N$_2$ |
| | 4 | 15 | — | MgO: 0.5<br>Y$_2$O$_3$: 1.5 | " | 1800° C. × 1 hr, in N$_2$ | 1500° C. × 1 hr, in N$_2$ |
| | 5 | 15 | — | SiO$_2$: 8<br>Y$_2$O$_3$: 4 | " | 1800° C. × 1 hr, in Ar | 1500° C. × 1 hr, in Ar |
| | 6 | 15 | — | SiO$_2$: 8<br>Y$_2$O$_3$: 4 | " | 1400° C. × 1 hr, in N$_2$ | 1500° C. × 1 hr, in N$_2$ |
| | 7 | 15 | — | SiO$_2$: 8<br>Y$_2$O$_3$: 4 | " | 2000° C. × 1 hr, in N$_2$ | 1500° C. × 1 hr, in N$_2$ |

TABLE 4

|  |  | Amount of $N_2$: % | Porosity | Bending strength: kg/mm$^2$ | Fracture toughness: MPam$^{1/2}$ |
|---|---|---|---|---|---|
| Inventive example B | 1 | 0.6 | 0.2 | 80 | 4.3 |
|  | 2 | 0.9 | 0.2 | 84 | 4.9 |
|  | 3 | 1.2 | 0.1 | 95 | 5.1 |
|  | 4 | 1.3 | 0.1 | 89 | 5.0 |
|  | 5 | 1.2 | 0.3 | 80 | 5.1 |
|  | 6 | 1.2 | 0.6 | 80 | 5.5 |
|  | 7 | 0.5 | 2.0 | 65 | 4.4 |
|  | 8 | 0.8 | 0.1 | 83 | 5.2 |
| Comparative example <b> | 1 | 0.8 | 0.08 | 71 | 3.1 |
|  | 2 | 0.9 | 7.8 | 31 | Measurement; impossible |
|  | 3 | 2.1 | 1.2 | 36 | 2.9 |
|  | 4 | 0.21 | 10.5 | 25 | Measurement; impossible |
|  | 5 | 0.09 | 2.9 | 42 | 3.2 |
|  | 6 | 2.0 | 15.8 | 22 | Measurement; impossible |
|  | 7 | 2.4 | 6.5 | 30 | 3.1 |

TABLE 5

|  |  | SiC whisker: wt % | Compound: wt % | Sintering auxiliary agent: wt % | Compacting method | Sintering condition | HIP condition |
|---|---|---|---|---|---|---|---|
| Inventive example C | 1 | 10 | TiC: 4 | SiO$_2$: 5 Y$_2$O$_3$: 3 | Die-pressing | 1750° C. × 1 hr, in N$_2$ | 1500° C. × 1 hr, 1500 atm, in N$_2$ |
|  | 2 | 15 | TiC: 8 | MgO: 4 Y$_2$O$_3$: 8 | " | 1750° C. × 1 hr, in N$_2$ | 1500° C. × 1 hr, 1500 atm, in N$_2$ |
|  | 3 | 15 | VC: 4 | MgO: 4 ZrO$_2$: 8 | " | 1750° C. × 1 hr, in N$_2$ | 1500° C. × 1 hr, 1500 atm, in N$_2$ |
|  | 4 | 20 | TiC: 4 | MgO: 4 Y$_2$O$_3$: 8 | " | 1750° C. × 1 hr, in N$_2$ | 1500° C. × 1 hr, 1500 atm, in N$_2$ |
|  | 5 | 10 | TiC: 4 | SiO$_2$: 5 Y$_2$O$_3$: 3 | " | 1750° C. × 1 hr, in N$_2$ | — (:No HIP) |
| Comparative example <c> | 1 | 15 | TiC: 8 | MgO: 4 Y$_2$O$_3$: 8 | " | 1750° C. × 1 hr, in Ar | 1500° C. × 1 hr, 1500 atm, in Ar |
|  | 2 | 3 | TiC: 4 | SiO$_2$: 5 Y$_2$O$_3$: 3 | " | 1750° C. × 1 hr, in N$_2$ | 1500° C. × 1 hr, 1500 atm, in N$_2$ |
|  | 3 | 35 | TiC: 4 | SiO$_2$: 5 Y$_2$O$_3$: 3 | " | 1750° C. × 1 hr, in N$_2$ | 1500° C. × 1 hr, 1500 atm, in N$_2$ |
|  | 4 | 10 | TiC: 4 | SiO$_2$: 0.5 Y$_2$O$_3$: 1.5 | " | 1750° C. × 1 hr, in N$_2$ | 1500° C. × 1 hr, 1500 atm, in N$_2$ |
|  | 5 | 10 | TiC: 4 | SiO$_2$: 12 Y$_2$O$_3$: 24 | " | 1750° C. × 1 hr, in N$_2$ | 1500° C. × 1 hr, 1500 atm, in N$_2$ |

TABLE 6

|  |  | Amount of $N_2$: % | Porosity | Bending strength: kg/mm$^2$ | Fracture toughness: MPam$^{1/2}$ |
|---|---|---|---|---|---|
| Inventive example C | 1 | 1.0 | 0.1 | 92 | 4.1 |
|  | 2 | 1.2 | 0.2 | 84 | 4.9 |
|  | 3 | 1.4 | 0.2 | 82 | 5.0 |
|  | 4 | 1.0 | 0.5 | 80 | 5.5 |
|  | 5 | 0.5 | 3.5 | 75 | 4.8 |
| Comparative example <c> | 1 | 0.08 | 3.4 | 60 | 4.0 |
|  | 2 | 0.9 | 0.1 | 82 | 3.1 |
|  | 3 | 0.9 | 11.1 | 28 | Measurement; impossible |
|  | 4 | 1.6 | 8.6 | 30 | Measurement; impossible |
|  | 5 | 1.2 | 0.5 | 42 | 2.8 |

TABLE 7

|  |  | SiC whisker: wt % | Compound: wt % | Sintering auxiliary agent: wt % | Sintering condition | HIP condition |
|---|---|---|---|---|---|---|
| Inventive example D | 1 | 15 | — | MgO: 1, ZrO$_2$: 2, Y$_2$O$_3$: 4 | 1750° C. × 1 hr | 1450° C. × 1 hr |
|  | 2 | 15 | TiC: 4 | MgO: 1, ZrO$_2$: 2, Y$_2$O$_3$: 4 | 1800° C. × 1 hr | " |
|  | 3 | 15 | TiC: 8 | MgO: 1.4, ZrO$_2$: 3, Y$_2$O$_3$: 6 | 1820° C. × 1 hr | " |
|  | 4 | 20 | — | MgO: 1.8, ZrO$_2$: 4, Y$_2$O$_3$: 8 | 1750° C. × 1 hr | " |
|  | 5 | 15 | VC: 2 WC: 4 | MgO: 1, ZrO$_2$: 2, Y$_2$O$_3$: 4 | 1750° C. × 1 hr | " |
|  | 6 | 10 | TiN: 4, | MgO: 1.8, ZrO$_2$:4, Y$_2$O$_3$: 8 | 1750° C. × 1 hr | " |
|  | 7 | 12.5 | TiB$_2$: 10 | MgO: 1.8, ZrO$_2$: 4, Y$_2$O$_3$: 8 | 1770° C. × 1 hr | " |
| Comparative example <d> | 1 | 15 | — | MgO: 1.4, Y$_2$O$_3$: 6 | 1750° C. × 1 hr | " |
|  | 2 | 15 | — | SiO$_2$: 4, Y$_2$O$_3$:4 | 1800° C. × 1 hr | " |
|  | 3 | 15 | — | MgO: 1.4, ZrO$_2$:6 | 1750° C. × 1 hr | " |
|  | 4 | 15 | — | MgO: 5, ZrO$_2$: 10, Y$_2$O$_3$: 15 | 1750° C. × 1 hr | " |
|  | 5 | 15 | — | MgO: 0.1, ZrO$_2$: 0.1, Y$_2$O$_3$: 0.5 | 1800° C. × 1 hr | " |

TABLE 8

|  |  | Amount of N$_2$: % | Porosity: % | Bending strength: kg/mm$^2$ | Fracture toughness: MPam$^{1/2}$ | Hardness Hv |
|---|---|---|---|---|---|---|
| Inventive example D | 1 | 0.4 | 0.0 | 100 | 5.4 | 1820 |
|  | 2 | 0.8 | 0.2 | 96 | 4.9 | 1900 |
|  | 3 | 1.0 | 0.1 | 110 | 5.4 | 2100 |
|  | 4 | 0.7 | 0.3 | 86 | 5.1 | 1880 |
|  | 5 | 0.5 | 0.0 | 100 | 5.6 | 2050 |
|  | 6 | 1.7 | 0.2 | 88 | 4.8 | 1900 |
|  | 7 | 0.6 | 0.3 | 85 | 4.9 | 1950 |
| Comparative example <d> | 1 | 0.6 | 0.2 | 76 | 4.4 | 1670 |
|  | 2 | 0.5 | 0.8 | 71 | 4.2 | 1610 |
|  | 3 | 0.8 | 1.2 | 68 | 4.3 | 1590 |
|  | 4 | 1.2 | 0.2 | 70 | 4.6 | 1600 |
|  | 5 | 0.3 | 7.2 | 46 | 4.6 | 1520 |

TABLE 9

|  |  | SiC whisker | | | Mixing time: Hr | Porosity: % | Bending strength: kg/mm$^2$ | Fracture toughness: MPam$^{1/2}$ |
|---|---|---|---|---|---|---|---|---|
|  |  | Diameter: μm | Aspect ratio | Content: wt % | | | | |
| Inventive example D-2 | | 0.8 | 15 | 15 | 20 | 0.2 | 96 | 4.9 |
| Comparative example E | 1 | 0.2 | 15 | 15 | 20 | 0.2 | 83 | 3.0 |
|  | 2 | 2.0 | 15 | 15 | 20 | 0.2 | 62 | 5.5 |
|  | 3 | 0.8 | 2 | 15 | 240 | 0.2 | 68 | 2.7 |
|  | 4 | 0.8 | 50 | 15 | 5 | 8.8 | 35 | Measurement; impossible |
|  | 5 | 0.8 | 30 | 25 | 20 | 21.1 | 23 | Measurement; impossible |
|  | 6 | 0.8 | 60 | 5 | 1 | 0.1 | 43 | 3.2 |

TABLE 10

| | | Compound: wt % | Compacting method | Compacting pressure: ton/cm² | Sintering condition (atmosphere: all in N₂) | Density of HIP material: % | Bending strength: kg/mm² | Fracture toughness: MPam^{1/2} |
|---|---|---|---|---|---|---|---|---|
| Inventive example F | 1 | — | Die-pressing | 3 | 1750° C. × 1 hr | 99.9 | 98 | 5.2 |
| | 2 | — | Die-pressing | 4.5 | 1750° C. × 1 hr | 100 | 100 | 5.4 |
| | 3 | TiC: 4 | Die-pressing | 4.5 | 1800° C. × 1 hr | 100 | 96 | 4.9 |
| | 4 | VC: 2 WC: 4 | Die-pressing | 4.5 | 1750° C. × 1 hr | 99.9 | 100 | 5.6 |
| | 5 | — | CIP | 3 | 1750° C. × 1 hr | 99.8 | 90 | 5.1 |
| | 6 | — | CIP | 4.5 | 1750° C. × 1 hr | 100 | 95 | 5.1 |
| Comparative Example G | 1 | — | Die-pressing | 1.5 | 1750° C. × 1 hr | 94.1 | 48 | 4.1 |
| | 2 | — | CIP | 1.5 | 1750° C. × 1 hr | 93.9 | 40 | 4.0 |
| | 3 | TiC: 4 | Die-pressing | 1.5 | 1800° C. × 1 hr | 93.5 | 42 | 3.9 |

Note)
HIP condition . . . all in N₂, 1500° C. × 1 hr, 1500 atm

EXAMPLE 6

An Al₂O₃ sintered body having the same composition as that of Inventive Example No. D-2 was manufactured in the same manner as in Example 4, except that the diameter, average aspect ratio, and content <c> of SiC whiskers; raw powder mixing time <t> in a ball mill; and a porosity were changed as shown in Table 9. The sintered body was measured for the bending strength and fracture toughness. As a result, as shown in Table 9, in the Al₂O₃ sintered body of Inventive Example No. D-2, the diameter of SiC whiskers is 0.8 μm; the aspect ratio is 15; the content <c> is 15%; the mixing time <t> is 20 hr; the porosity was 0.2; the bending strength is 96 kg/mm²; and the fracture toughness is 4.9 MPam^{1/2}. On the contrary, of Comparative Examples Nos. E1 to E6, in Comparative Example No. E1, the diameter of SiC whiskers is less than 0.4 μm, so that the bending strength is substantially similar to that of Inventive Example No. D-2 but the fracture toughness is lower. In Comparative Example No. E2, the diameter of SiC whiskers is larger than 1.5 μm, so that the bending strength is lower though the fracture toughness is similar to that of Inventive Example No. D-2. In Comparative Example No. E3, the mixing time <t> is more than 2000 hr and thereby the aspect ratio is less than 3, so that the bending strength and the fracture toughness are lower. In Comparative Example Nos. E4 and E5, the mixing time <t> is less than (2c-20) and thereby the aspect ratio is large, so that the product of the aspect ratio and the content <c> of SiC whiskers is more than 400, as a result of which the densification is poor and the porosity is large. In Comparative Example No. E6, the mixing time <t> is less than 2 hr, so that the structure is not homogeneous, resulting the reduced strength.

EXAMPLE 7

In the Al₂O₃ sintered body of Inventive Example No. D-2, wherein the drying of the mixed powder after wet mixing is performed by spray drying, the bending strength is 96 kg/mm² and the fracture toughness is 4.9 MPam^{1/2}. An Al₂O₃ sintered body having the same composition as that of Inventive Example No. D-2 was obtained in the same manner as in Example 4 except that the spray drying was replaced by the tray drying. In the sintered body thus obtained, the bending strength was 37 kg/mm² and the fracture toughness was 4.2 MPam^{1/2}.

EXAMPLE 8

Figure 2:
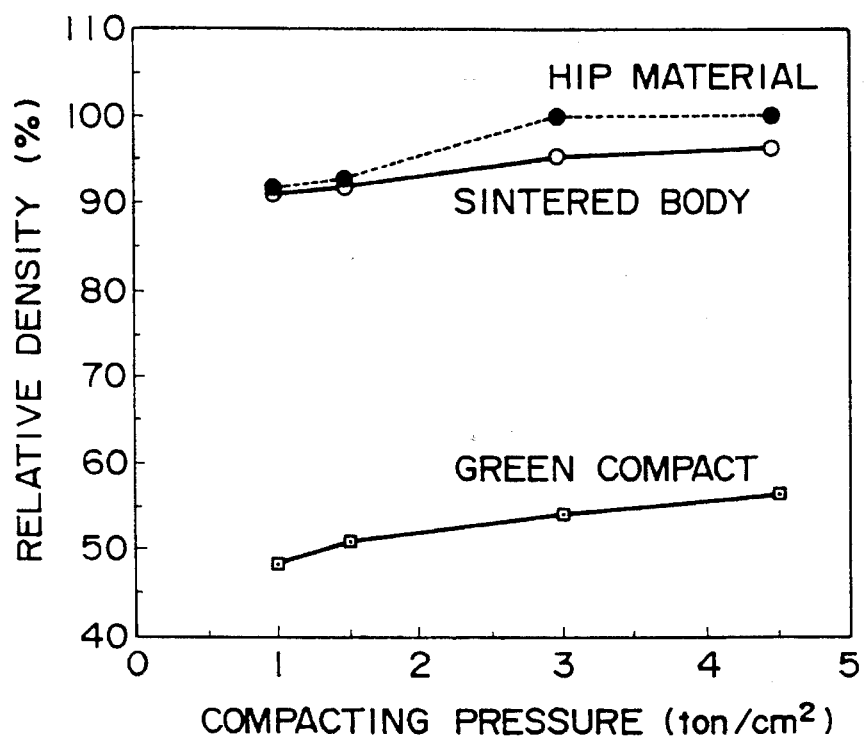
FIG. 2 is a graph showing the relationship between the compacting pressure upon cold-isostatic pressing a mixed powder, and relative densities of a green compact, a sintered body and an HIP material, according to Example 8.

Using a mixed powder having the same composition as that of Inventive Example No. D-2, there was examined the effect of the compacting pressure in die-pressing or cold-isostatic-pressing (hereinafter, referred to as CIP) the mixed powder exerted on the densities of a green compact, sintered body and HIP material. The results are shown in FIG. 1 (for die pressing) and FIG. 2 (for CIP). As the compacting pressure is increased, the green density becomes high and thereby the sintered density becomes high. The density of the HIP material reaches about 100% in the relative density when the compact pressure is 3.0 ton/cm² or more.

EXAMPLE 9

A mixed powder containing 15 wt % of SiC whiskers, a sintering auxiliary agent composed of 0.1 wt % of MgO, 2 wt % of ZrO2 and 4 wt % of Y₂O₃, and an Al₂O₃ based ceramic raw powder as a base material, or a compound shown in Table 10 was compacted, and then subjected to pressureless-sintering and HIP under the conditions shown in Table 10. The Al₂O₃ based ceramic material thus obtained was measured for the density, bending strength and fracture toughness. The results are shown in Table 10. In Inventive Example Nos. F1 to F6, which are compacted at a compacting pressure of 3 ton/cm², the bending strength and fracture toughness are high. On the contrary, in Comparative Example Nos. G1 to G3, which are compacted at a compacting pressure of less than 3 ton/cm², the bending strength and fracture toughness are low.

What is claimed is:

1. An Al₂O₃ ceramic material comprising an Al₂O₃ sintered body, said Al₂O₃ sintered body containing:

5–30 wt % of SiC whiskers;

3–30 wt % of a sintering auxiliary agent selected from the group consisting of oxides of Mg, Si, Ca, Ti, Zr, Cr, Ni, Y and rare earth elements; and 0.2 wt % or more of nitrogen, wherein said sintering auxiliary agent contains 1–1.8 wt % of MgO, 2–4 wt % of ZrO₂ and 4–8 wt % of Y₂O₃ such that the total content of the these oxides is 20 wt % or less.

2. An Al₂O₃ ceramic material comprising an Al₂O₃ sintered body, said Al₂O₃ sintered body containing:

5–30 wt % of SiC whiskers;

0.5–40 wt % of at least one carbide, nitride, boride or carbonitride of a transition element selected from the group consisting of elements in the groups IVa, Va, and VIa of the periodic table;

3–30 wt % of a sintering auxiliary agent selected from the group consisting of oxides of Mg, Si, Ca, Ti, Zr, Cr, Ni, Y and rare earth elements; and 0.2 wt % or more of nitrogen, excluding the nitrogen contained in any nitride of said transition element;

wherein said sintering auxiliary agent contains 1–1.8 wt % of MgO, 2–4 wt % of $ZrO_2$ and 4–8 wt % of $Y_2O_3$.

3. An $Al_2O_3$ ceramic material according to claim 1 or 2, wherein the porosity of said $Al_2O_3$ sintered body is 1% or less.

4. Ar $Al_2O_3$ based ceramic material according to any of claims 1 or 2, wherein the particle size of $Al_2O_3$ in said $Al_2O_3$ sintered body is 5 μm or less.

5. An $Al_2O_3$ ceramic material according to any of claims 1, or 2 wherein the average aspect ratio of said SiC whiskers is 3 or more, and the diameters of said SiC whiskers are in the range of from 0.4 to 1.5 μm.

6. An $Al_2O_3$ ceramic material according to any of claims 1, or 2 wherein the product of said average aspect ratio of said SiC whiskers and the content of said SiC whiskers in said $Al_2O_3$ sintered body is 400 or less.

7. An $Al_2O_3$ ceramic material according to any one of claims 1 or 2, wherein the total content of MgO, $ZrO_2$ and $Y_2O_3$ is 10–15 wt. %.

8. An $Al_2O_3$ ceramic material according to any one of claims 1 or 2, wherein the total content of MgO, $ZrO_2$ and $Y_2O_3$ is 8–12 wt. %.

9. An $Al_2O_3$ ceramic material according to any one of claims 1 or 2, comprising 10–20 wt. % of said SiC whiskers.

10. An $Al_2O_3$ ceramic material according to any one claims 1 or 2, comprising 15–20 wt. % of said SiC whiskers.

* * * * *